US010462095B2

(12) United States Patent
Abou Mahmoud et al.

(10) Patent No.: US 10,462,095 B2
(45) Date of Patent: Oct. 29, 2019

(54) TIME AND SENTIMENT BASED MESSAGING

(71) Applicant: International Business Machines Corporation, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 15/402,365

(22) Filed: Jan. 10, 2017

(65) Prior Publication Data

US 2018/0198749 A1 Jul. 12, 2018

(51) Int. Cl.
G06F 15/16 (2006.01)
H04L 12/58 (2006.01)
H04L 29/08 (2006.01)
H04W 4/21 (2018.01)

(52) U.S. Cl.
CPC ............ H04L 51/32 (2013.01); H04L 67/325 (2013.01); H04W 4/21 (2018.02)

(58) Field of Classification Search
CPC .... G06Q 50/01; G06Q 10/1053; G06Q 20/10; G06Q 20/12; G06Q 30/0201; H04L 67/22; H04L 67/306; H04L 51/32; H04L 63/1425; H04L 63/1433; G06F 21/6245; G06F 21/6254; G06F 11/3438
See application file for complete search history.

(56) References Cited

U.S. PATENT DOCUMENTS

| 8,995,822 B2 | 3/2015 | Vasudevan et al. |
| 2009/0106096 A1 | 4/2009 | Horowitz |
| 2009/0319342 A1 | 12/2009 | Shilman et al. |

(Continued)

OTHER PUBLICATIONS

"Google Advertising Patents for Behavioral Targeting, Personalization and Profiling", [retrieved from https://www.searchenginejournal.com/google-advertising-patents-for-behavioral-targeting-personalization-and-profiling/2311/], Oct. 2005.

(Continued)

*Primary Examiner* — Michael A Keller
*Assistant Examiner* — Thao D Duong
(74) *Attorney, Agent, or Firm* — North Shore Patents, P.C.; Michele Liu Baillie

(57) ABSTRACT

In time and sentiment based messaging, a server obtains information for a set of messages from online social networks related to a specified object. The information includes at least a user identifier associated with each message, a time of each message, and content of each message. For each unique identifier, the server establishes an initial message from the set of messages related to the specified object, analyzes each message in the set of messages to determine a sentiment of each message, and builds a sentiment line time for each unique user identifier. The server then builds a time-based sentiment model related to the specified object by overlapping the sentiment time lines for each unique user identifier according to the initial message for each unique user identifier. A targeted message to a set of one or more users may then be generated using the time-based sentiment model.

11 Claims, 4 Drawing Sheets

(56) References Cited

U.S. PATENT DOCUMENTS

| | | | |
|---|---|---|---|
| 2013/0243392 A1* | 9/2013 | Vasudevan | H04N 21/23418 386/241 |
| 2014/0136332 A1 | 5/2014 | Amit et al. | |
| 2014/0337126 A1 | 11/2014 | Ohanyan et al. | |
| 2015/0106360 A1* | 4/2015 | Cao | G06Q 10/00 707/723 |
| 2015/0186947 A1* | 7/2015 | Huang | G06Q 30/0269 705/14.66 |
| 2017/0142200 A1* | 5/2017 | Kodner | H04L 67/22 |

OTHER PUBLICATIONS

"What is the IBM Social Sentiment Index?", [retrieved from https://www.ibm.com/analytics/in/en/conversations/social-sentiment.html] in Aug. 2016.

Chauhan, S., "Social Media Sentiment Analysis is on Trend for Tracking Trends", [retrieved from http://www.netbase.com/blog/social-media-sentiment-analysis-on-trend/], Feb. 2016.

Constine, J., "Facebook Patents Clever Way to Advertise Just to Important People", [retrieved from https://techcrunch.com/2015/02/16/facebook-influencer-marketing/], Feb. 2015.

Etherington, D., "Apple Patent Explores Mood-Based Ad Targeting", [retrieved from http://techcrunch.com/2014/01/23/apple-patent-explores-mood-based-ad-targeting/], Jan. 2014.

Sterling, G., "Study: Ads Effective As Way to Stimulate Dormant App Usage, Prevent Deletion", [retrieved from http://marketingland.com/study-ads-effective-as-way-to-stimulate-dormant-app-usage-prevent-deletion-158703], Jan. 2016.

\* cited by examiner

TIME AND SENTIMENT BASED MESSAGING

BACKGROUND

Online social networks connect users and information in logical and organized ways which enable sharing and processing of information between the users. These mechanisms enable the rapid sharing of information with others and the gathering of information from messages posted on the social networks. The information from online social networks provide insight into user behaviors and interest. These insights may be used to present content related by keywords in the posted messages. However, the current state of the art fails to use this information to its full potential.

SUMMARY

Disclosed herein is a method for time and sentiment based messaging and a computer program product as specified in the independent claims. Embodiments of the present invention are given in the dependent claims. Embodiments of the present invention can be freely combined with each other if they are not mutually exclusive.

According to an embodiment of the present invention, in a method for time and sentiment based messaging, a server obtains information for a set of messages from online social networks related to a specified object. The information includes at least a user identifier associated with each message, a time of each message, and content of each message. For each unique identifier, the server establishes an initial message from the set of messages related to the specified object, analyzes each message in the set of messages to determine a sentiment of each message, and builds a sentiment line time for each unique user identifier. The server then builds a time-based sentiment model related to the specified object by overlapping the sentiment time lines for each unique user identifier according to the initial message for each unique user identifier. A targeted message to a set of one or more users may then be generated using the time-based sentiment model.

DETAILED DESCRIPTION

Figure 1:
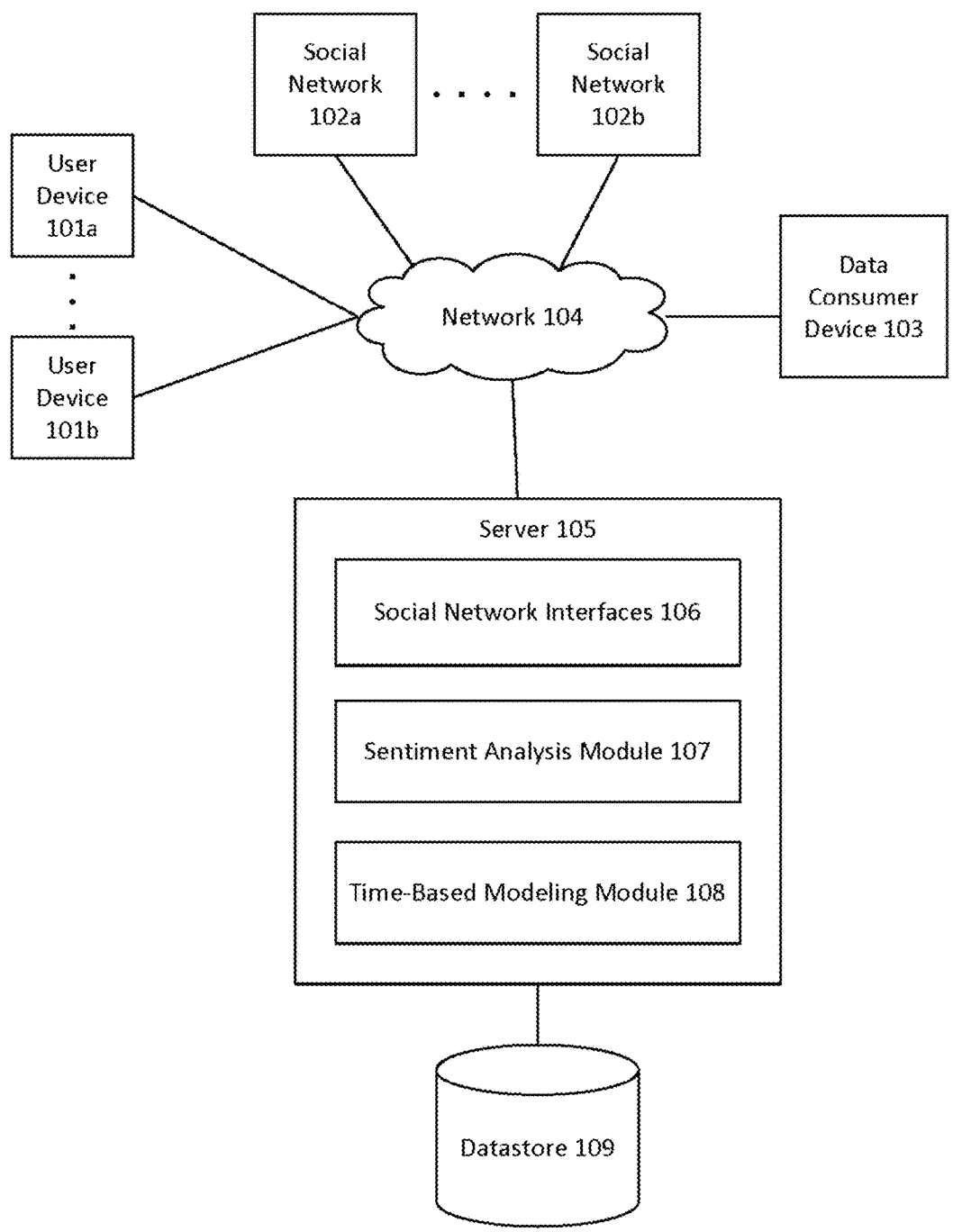
FIG. 1 illustrates an exemplary embodiment of a system for time and sentiment based messaging according to the present invention.

FIG. 1 illustrates an exemplary embodiment of a system for time and sentiment based messaging according to the present invention. The system includes a plurality of user devices 101a-101b, from which a plurality of users may post messages on one or more social network 102a-102b. A server 105 includes one or more social network interfaces 106 for obtaining information on the messages posted on the social network 102a-102b over a network 104. The server 105 further includes a sentiment analysis module 107 and a time-based modeling module 108, which analyze the information obtained from the social network 102a-102b and which may provide the results of the analysis to a data consumer device 103. The server 105 is coupled to a datastore 109 in which the information and the results of the analysis may be stored. The functions of the social network interfaces 106, the sentiment analysis module 107, and the time-based modeling module 108 are described further below.

Figure 2:
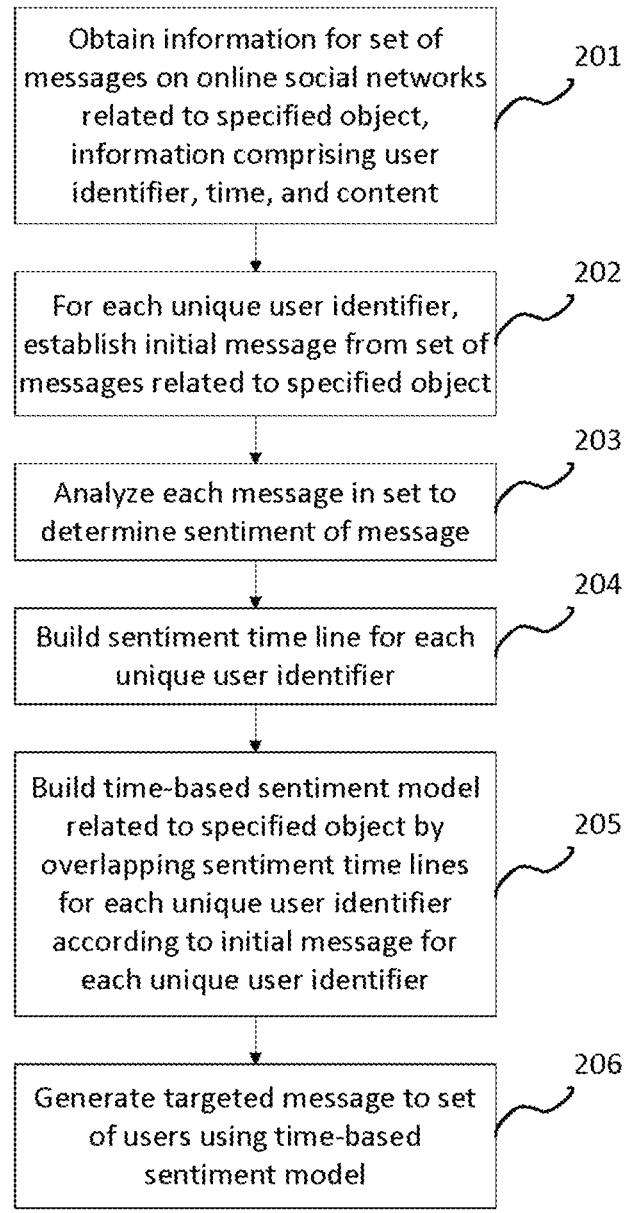
FIG. 2 illustrates an exemplary embodiment of a system for time and sentiment based messaging according to the present invention.

FIG. 2 illustrates an exemplary embodiment of a system for time and sentiment based messaging according to the present invention. The social network interfaces 106 at the server 105 obtains information for a set of messages from the online social networks 102a-102b that relate to a specified object (201). The information comprises at least a user identifier associated with the message, a time of the message, and the content of the message. In an exemplary embodiment, the server 105 may subscribe to data feeds through a compliant application programming interface (API). The social network interfaces 106 obtain the information by detecting certain events, such as a push event, a pull event, or a user interface (UI) event. A push event is detected when a message is published to a user and when the message is being distributed to others in a social network. A pull event is detected by continuously monitoring for an updated entry that is added to a message list. A UI event may be intercepted based on a submission hook, the activation of a menu action, or the activation of a UI element. The information obtained by the social network interfaces 106 are stored in the datastore 109. From the information obtained by the social network interfaces 106, the time-based modeling module 108 may retrieve a set of the messages related to the specified object from the plurality of messages obtained by the social network interfaces 106. In an exemplary embodiment, the time-based modeling module 108 may receive a selection of the specified object, such as from a data consumer device 103. An ontology for the selected object is then built, and the set of messages retrieved using the ontology for the specified object.

For each unique user identifier in the set of messages, the time-based modeling module 108 establishes an initial message from the set of messages related to the specified object (202). In this exemplary embodiment, the time-based modeling module 108 identifies the unique user identifiers in the set of messages and organizes the messages in the set based on the unique user identifier. The set of messages are normalized based on the time associated with the messages. For each unique user identifier, the time-based modeling module 108 establishes the initial message (202). Possible manners of establishing the initial message for a unique user identifier includes: identifying the message with the first mention of the specified object by a user (e.g. "cell phone"); identifying the message by the user containing words that indicate new usage (e.g. "just got my new phone"); identifying the message with the first positive mention of the specified object (e.g. "love this feature on my phone"); and identifying the first message by the user to include keywords or activities as configured by a data consumer device 103 (e.g. "phone" and "birthday"). Other techniques for identifying the initial message may be used without departing from the spirit and scope of the present invention.

Once the initial message is established for each unique user identifier, the sentiment analysis module 107 evaluates each message in the set to determine a sentiment of the message (203) (e.g. level of positive or negative sentiment). The time-based modeling module 108 builds a sentiment time line for each unique user identifier (204). The time-based modeling module 108 then builds a time-based sentiment model related to the specified object by overlapping the sentiment time lines for each unique user identifier according to the initial message for each unique user identifier (205). The time-based sentiment model may then be used to generate a targeted message to a set of one or more users (206).

For example, the time-based sentiment model may be built for a time period representing a lifecycle of the specified object. The time-based sentiment model thus represents users' sentiments towards the specified object over the life of the specified object. From this model, sentiment inflection points may be identified that represent key changes in sentiment and their time positions in the specified object's lifecycle. A data consumer device 103 may use the inflection points in the time-based sentiment model to predict when the sentiment about the specified object may change for other users. The data consumer device 103 may then schedule a message to target this specific sentiment inflection point, possibly also toward a specific user type. Example messages that may be scheduled by the data consumer device 103 includes an advertisement or a promotion designed to prolong a positive sentiment, reverse a negative sentiment, to aid in a transition to a newer version of the specified object, or to aid in a transition to a different object. The duration of the time increments within the time-based sentiment model may be a configurable parameter, set according to the length of the specified object's lifecycle and/or the rate at which sentiments may change. For example, for a lifecycle of a month, a daily time increment may be configured. For a lifecycle of years, a monthly time increment may be configured.

The time-based sentiment model may be continuously updated using additional messages. Optionally, the server 105 may mine past messages with positive sentiments in order to suggest new messages or a cadence of new messages to encourage similar positive sentiment. The cadence of new messages may include suggestions to users to post on the specified object in order to determine the users' current sentiment toward the specified object. Any posts by the users may then be used to update the time-based sentiment model.

Figure 3:
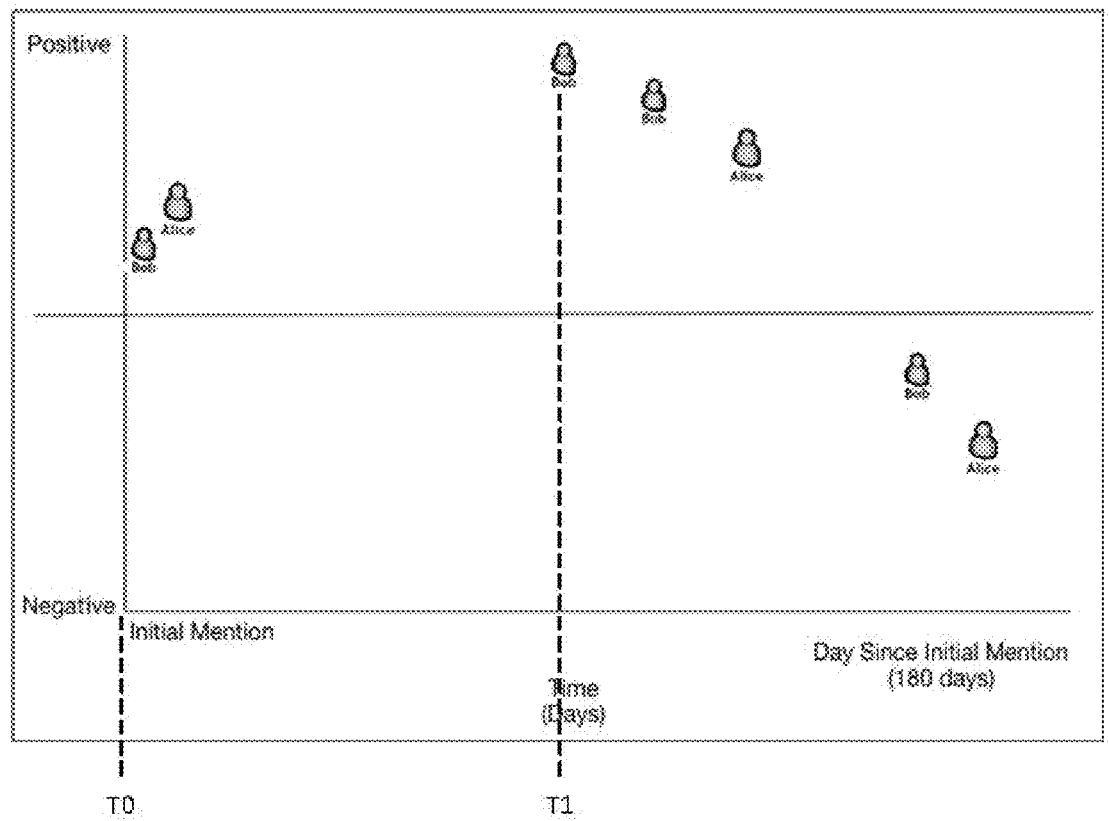
FIG. 3 illustrates an example scenario of a time-based sentiment model built according to an exemplary embodiment of the present invention.

FIG. 3 illustrates an example scenario of a time-based sentiment model built according to an exemplary embodiment of the present invention. In the example scenario, assume that a mobile phone vendor wants to generate higher sales for a particular brand of mobile phone, X. "X", and its related key terms and concepts, are thus configured as the specified object. The social network interfaces 106 obtain information for messages posted on the social networks 102a-102b related to "X" (201) for two unique user identifiers, "Alice" and "Bob". The time-based modeling module 108 establishes the initial message related to X posted by Alice and Bob (202), and the sentiment analysis module 107 analyzes each message posted by Alice and Bob to determine the sentiment of each message (203). Assume that in this scenario, the following data, {user identifier, time, content, sentiment}, results from the analysis:
{Bob, 2015-01-01 12:00, "New X, it's awesome", positive}
{Alice, 2015-02-01 13:00, "Oh yeah, my new X", positive}
{Bob, 2015-02-01 15:00, "These apps are awesome", positive}
{Bob, 2015-02-10 15:00, "#farmville—I need your help . . . thank goodness for the X", positive}
{Alice, 2015-02-10 17:00, "#words with friends . . . anyone want to play?", positive}
{Bob, 2015-05-20 15:00, "so frustrating #X", negative}
{Alice, 2015-06-25 17:00, "I can't stand these phone updates", negative}

The time-based modeling module 108 builds sentiment time lines for Alice and Bob (204), and builds a time-based sentiment model related to X by overlapping the sentiment time lines for Alice and Bob. As illustrated in the exemplary graph in FIG. 3, the sentiments of Alice and Bob are plotted over time in increments of days, with both initial messages by Alice and Bob placed at time T0. Using a best fit function, a key inflection point at time T1 may be identified.

Assume in this scenario that a time line related to X for an additional user, Carl, is built in the same manner as for Alice and Bob. The time line for Carl may also be overlapped onto the time-based model related to X by placing the initial message by Carl at T0. Utilizing this time-based sentiment model related to X, and the key inflection point at T1, a prediction may be made that Carl's sentiments related to X may change at T1 in the lifecycle of X owned by Cad. Messages may be scheduled and targeted at Cad to influence his sentiments toward X based on the inflection point T1.

Figure 4:
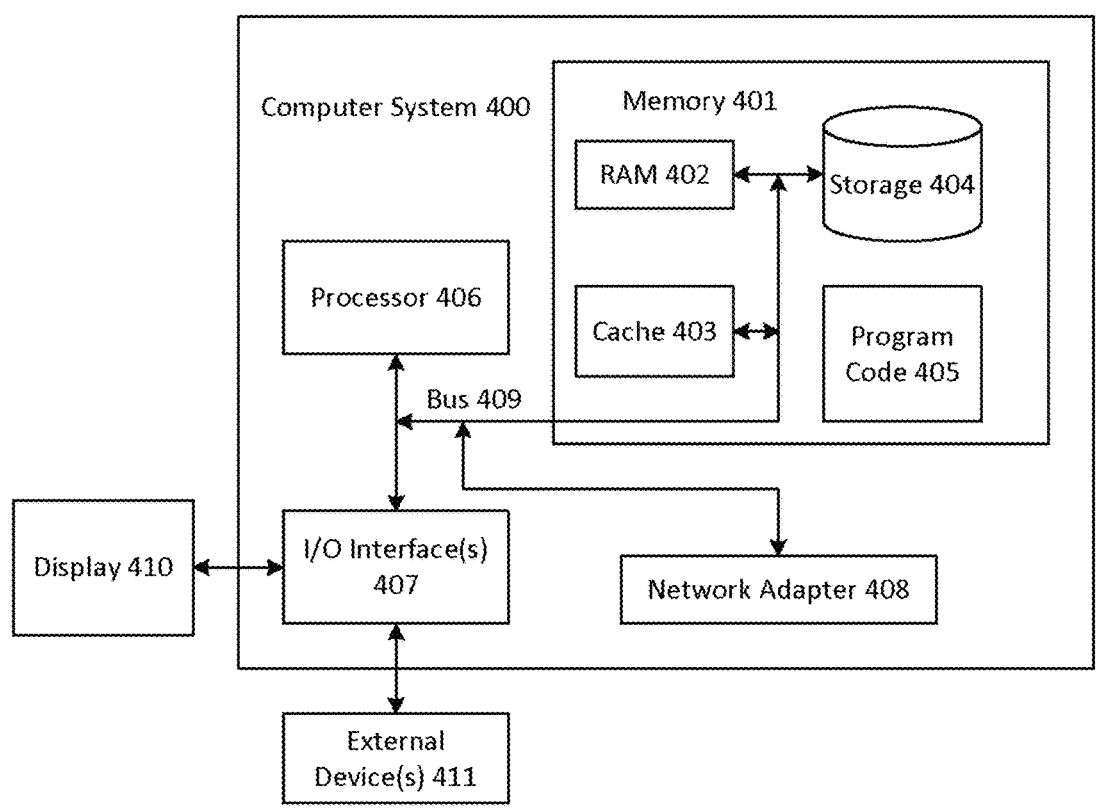
FIG. 4 illustrates a computer system for implementing the embodiments of the present invention.

FIG. 4 illustrates a computer system for implementing the embodiments of the present invention. The computer system 400 is operationally coupled to a processor or processing units 406, a memory 401, and a bus 409 that couples various system components, including the memory 401 to the processor 406. The bus 409 represents one or more of any of several types of bus structure, including a memory bus or memory controller, a peripheral bus, an accelerated graphics port, and a processor or local bus using any of a variety of bus architectures. The memory 401 may include computer readable media in the form of volatile memory, such as random access memory (RAM) 402 or cache memory 403, or non-volatile storage media 404. The memory 401 may include at least one program product having a set of at least one program code module 405 that are configured to carry out the functions of embodiment of the present invention when executed by the processor 406. The computer system 400 may also communicate with one or more external devices 411, such as a display 410, via I/O interfaces 407. The computer system 400 may communicate with one or more networks via network adapter 408.

In the above described manner, information from messages on online social networks may be leveraged to provide targeted messages based on a time and sentiment model over a lifecycle of a specified object.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for time and sentiment based messaging, comprising:
   obtaining, by a server, information for a set of messages from online social networks related to a specified object, the information comprising at least a user identifier associated with each message, a time of each message, and content of each message;
   for each unique identifier, establishing, by the server, an initial message from the set of messages related to the specified object;
   analyzing, by the server, each message in the set of messages to determine a sentiment of each message toward the specified object;
   building, by the server, a sentiment time line for each unique user identifier using the sentiment of each message toward the specified object;

building, by the server, a time-based sentiment model related to the specified object by overlapping the sentiment time lines for each unique user identifier according to the initial message for each unique user identifier;

identifying, by the server, a sentiment inflection point in the time-based sentiment model, the sentiment inflection point representing a change in the sentiment toward the specified object;

building, by the server, a new sentiment time line for an additional unique user identifier;

overlapping, by the server, the new sentiment time line with the time-based sentiment model according to an initial message for the additional unique user identifier;

predicting, by the server, a change in the sentiment related to the specified object by the additional unique user identifier based on the new sentiment time line, the time-based sentiment model, and the sentiment inflection point; and generating a message targeting the predicted change in the sentiment related to the specified object by the additional unique user identifier.

2. The method of claim 1, wherein the establishing of the initial message from the set of messages related to the specified object for each unique identifier comprises:
identifying the unique user identifiers in the set of messages and organizing the set of messages according to the unique user identifiers;
normalizing the set of messages based on the time of each message in the set; and
for each unique user identifier, establishing the initial message.

3. The method of claim 1, wherein the time-based sentiment model relates to the specified object over a lifecycle of the specified object.

4. The method of claim 1, wherein the sentiment inflection point is a point in a lifecycle of the specified object when sentiments toward the specified object change.

5. A computer program product for time and sentiment based messaging, the computer program product comprising a computer readable storage medium having program instructions embodied therewith, the program instructions executable by a processor to cause the processor to:
obtain information for a set of messages from online social networks related to a specified object, the information comprising at least a user identifier associated with each message, a time of each message, and content of each message;
for each unique identifier, establish an initial message from the set of messages related to the specified object;
analyze each message in the set of messages to determine a sentiment of each message toward the specified object;
build a sentiment time line for each unique user identifier using the sentiment of each message toward the specified object;
build a time-based sentiment model related to the specified object by overlapping the sentiment time lines for each unique user identifier according to the initial message for each unique user identifier;
identify a sentiment inflection point in the time-based sentiment model, the sentiment inflection point representing a change in the sentiment toward the specified object;
build a new sentiment time line for an additional unique user identifier;
overlap the new sentiment time line with the time-based sentiment model according to an initial message for the additional unique user identifier;
predict a change in the sentiment related to the specified object by the additional unique user identifier based on the new sentiment time line, the time-based sentiment model, and the sentiment inflection point; and
generate a message targeting the predicted change in the sentiment related to the specified object by the additional unique user identifier.

6. The computer program product of claim 5, wherein the establishing of the initial message from the set of messages related to the specified object for each unique identifier comprises:
identify the unique user identifiers in the set of messages and organizing the set of messages according to the unique user identifiers;
normalize the set of messages based on the time of each message in the set; and
for each unique user identifier, establish the initial message.

7. The computer program product of claim 5, wherein the time-based sentiment model relates to the specified object over a lifecycle of the specified object.

8. The computer program product of claim 5, wherein the sentiment inflection point is a point in a lifecycle of the specified object when sentiments toward the specified object change.

9. A system, comprising:
a processor; and
a computer readable storage medium having program instructions embodied therewith, the program instructions executable by the processor to cause the processor to:
obtain information for a set of messages from online social networks related to a specified object, the information comprising at least a user identifier associated with each message, a time of each message, and content of each message;
for each unique identifier, establish an initial message from the set of messages related to the specified object;
analyze each message in the set of messages to determine a sentiment of each message toward the specified object;
build a sentiment time line for each unique user identifier using the sentiment of each message toward the specified object;
build a time-based sentiment model related to the specified object by overlapping the sentiment time lines for each unique user identifier according to the initial message for each unique user identifier;
identify a sentiment inflection point in the time-based sentiment model, the sentiment inflection point representing a change in the sentiment toward the specified object;
build a new sentiment time line for an additional unique user identifier;
overlap the new sentiment time line with the time-based sentiment model according to an initial message for the additional unique user identifier;
predict a change in the sentiment related to the specified object by the additional unique user identifier based on the new sentiment time line, the time-based sentiment model, and the sentiment inflection point; and
generate a message targeting the predicted change in the sentiment related to the specified object by the additional unique user identifier.

10. The system of claim 9, wherein the time-based sentiment model relates to the specified object over a lifecycle of the specified object.

11. The system of claim 9, wherein the sentiment inflection point is a point in a lifecycle of the specified object when sentiments toward the specified object change.

* * * * *